United States Patent [19]
Noland

[11] 4,091,261
[45] May 23, 1978

[54] ELECTRICALLY HEATED ANIMAL WATERING DEVICE

[76] Inventor: Wayne B. Noland, 340 Cresent Dr., Carlisle, Iowa 50047

[21] Appl. No.: 722,476

[22] Filed: Sep. 13, 1976

[51] Int. Cl.² .................... F22H 1/12; A01K 7/06; F16L 53/00
[52] U.S. Cl. .................... 219/301; 119/73; 137/301; 137/341; 138/32; 138/33; 138/116; 219/299; 222/146 HE
[58] Field of Search .................... 219/296–299, 219/301; 137/301, 341, 59; 138/32, 33, 34, 35, 116, 115; 119/73, 75; 222/146 HE, 146 R, 146 H

[56] References Cited

U.S. PATENT DOCUMENTS

| 186,411 | 1/1877 | Church | 138/32 |
|---|---|---|---|
| 1,576,218 | 3/1926 | Powell | 119/73 |
| 1,684,197 | 9/1928 | Petsch | 119/73 |
| 2,062,246 | 11/1936 | Atkinson | 138/32 |
| 2,351,544 | 6/1944 | Revard | 138/32 |
| 2,479,355 | 8/1949 | Hemker | 219/298 X |
| 2,932,313 | 4/1960 | Noland | 137/301 X |
| 3,932,727 | 1/1976 | True | 219/301 |
| 3,949,707 | 4/1976 | Armstrong et al. | 119/73 |

Primary Examiner—A. Bartis
Attorney, Agent, or Firm—Henderson, Strom, Sturm, Cepican & Fix

[57] ABSTRACT

An animal watering apparatus of a type having an inlet pipe connected to a source of water under pressure and an outlet valve which can be actuated by an animal to release water directly into the animal's mouth. A tubular casing is disposed around the water supply pipe. A conduit is disposed along side the water supply pipe within the casing and has a heating element therein for preventing the freezing of the watering apparatus. Still another conduit is disposed within the casing for allowing a power supply cord to be connected to the heating element. The casing being filled with an insulation material such a urethane foam. A baffle structure is provided in the water supply line for causing the water within the water supply line to continually circulate and thereby prevent a buildup of heat in the water which the animals are drinking and furthermore distributing the heat from the heating element along the entire water supply pipe so as to insure that it does not freeze.

4 Claims, 5 Drawing Figures

U. S. Patent    May 23, 1978    4,091,261
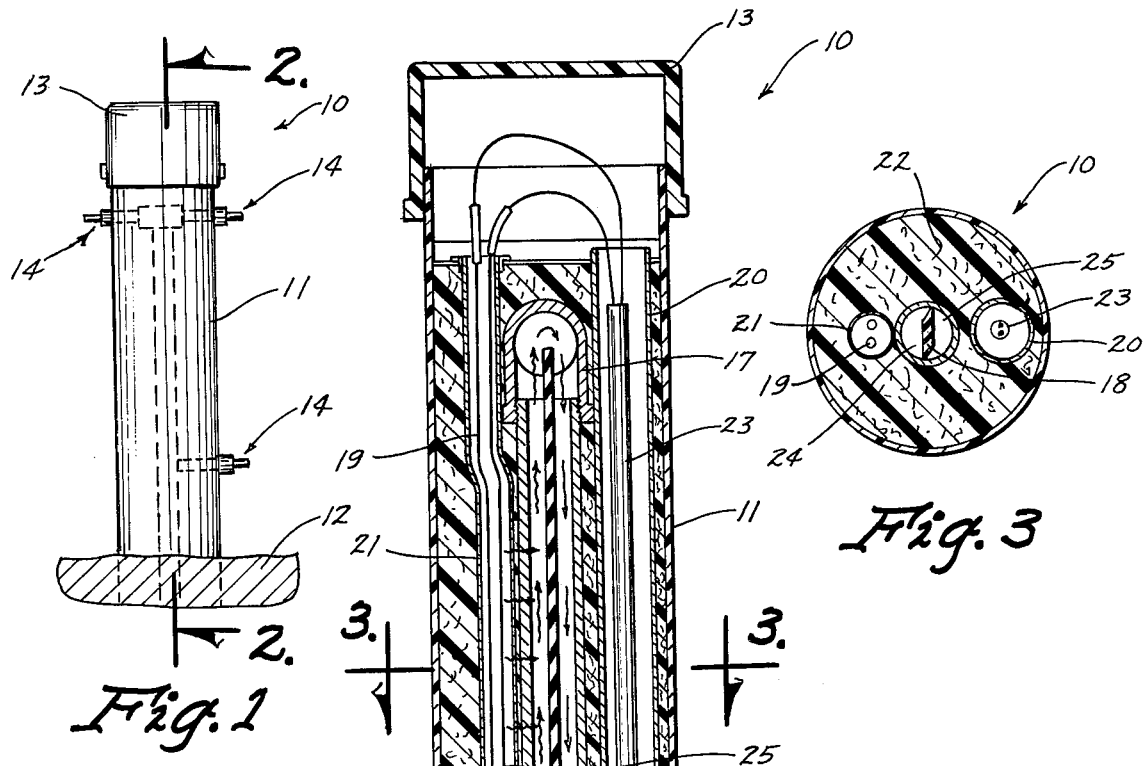
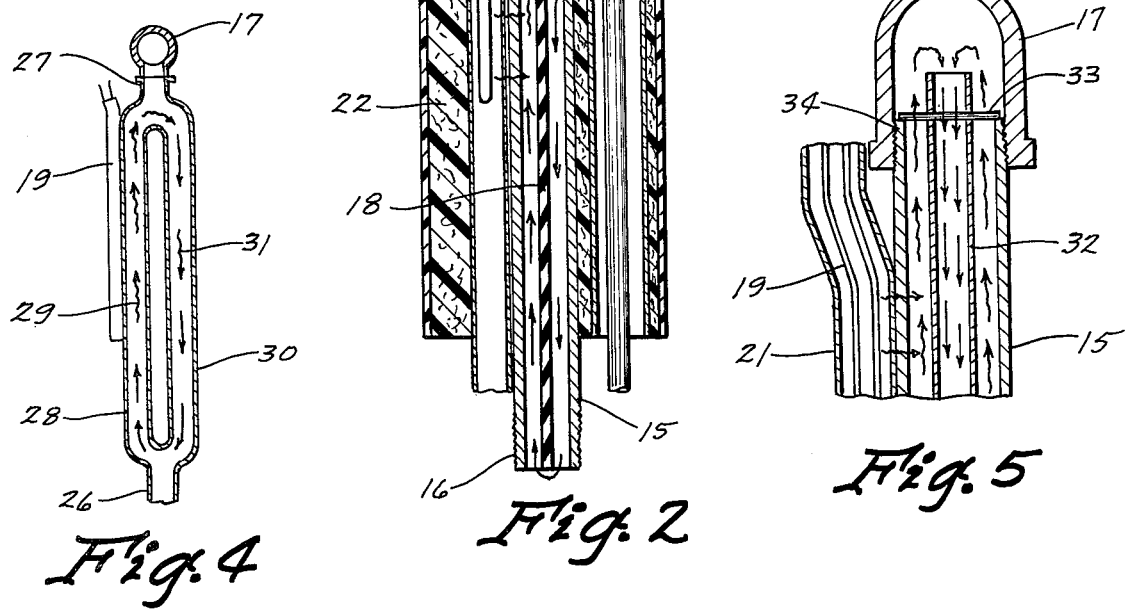

4,091,261

ELECTRICALLY HEATED ANIMAL WATERING DEVICE

BACKGROUND OF THE INVENTION

The present invention relates generally to animal watering devices and more particulary to a means for preventing such animal watering devices from freezing in cold weather.

Automatic watering devices for allowing animals to drink therefrom whenever desired have been in use for many years. One of the traditional problems with the use of such devices has been to keep them from freezing in cold weather. This problem has, of course, been solved in many ways, but many of these solutions are unacceptable because too much energy is required in order to keep such devices working properly. Various thermostatically controlled electrical heating elements have been used, but whenever a thermostat is added to the circuitry, this involves an additional expense for such an element and also tends to decrease the reliability because of the possible failure of such thermostatic element. Accordingly, it has been determined that the use of a very low wattage heating element which runs continuously can in some cases be far more economical and more reliable than many designs which use thermostatically controlled heating elements. One design for such a watering device using a low wattage heating element on a continuous basis in cold weather is disclosed in co-pending application Ser. No. 599,385 to Wayne B. and Gail L. Noland.

It has been determined, however, that there is one disadvantage of such a watering device having a heating element continually supplying heat to an insulated housing, and that is that if there are not enough animals to continuously use the waterer, it is possible that there can be a buildup of heat around the nipple valve from which the animals drink, thereby causing the water to be so warm that the animals are reluctant to drink therefrom.

One solution to this problem has been to reduce the amount of heat applied to the waterer, but it has been found that in certain cases other parts of the watering device may freeze unless a certain minimum of heat is supplied. Therefore, there is a need for a way to distribute the heat supplied so that a buildup of heat does not occur at the nipple valve.

SUMMARY OF THE INVENTION

The present invention relates to an animal watering apparatus having a water supply pipe leading from the source of water under pressure to a valve mechanism for supplying animals with water. A conduit is disposed adjacent to each side of the water supply pipe, one of the conduits being for the purpose of allowing a heating element to be disposed therein and the other of said conduits being for the purpose of allowing a power supply cord to be disposed therein. This entire assembly is disposed in a casing which is then filled with insulation material such a urethane foam. A structure is provided for allowing circulation of water within the water supply pipe so as to prevent a concentration of heat in the water supply pipe near the heating element, which heating element is normally positioned near the water outlet valve.

An object of the present invention is to provide an improved animal watering device.

Another object of the invention is to provide an economical mechanism for keeping animal watering devices from freezing in cold weather.

A further object of the invention is to provide a simple and yet low cost structure for preventing heat from building up at the water outlet of an animal watering device.

Still another object of the invention is to provide a structure for circulating water within an animal watering device without the use of expensive pumping structures.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevational view of an animal watering device constructed in accordance with the present invention;

FIG. 2 is an enlarged cross-sectional view taken along line 2—2 of FIG. 1;

FIG. 3 is a cross-sectional view taken along line 3—3 of FIG. 2;

FIG. 4 is a partial cross-sectional view similar to FIG. 2, but showing an alternate form of the invention; and FIG. 5 is an enlarged, partial, cross-sectional view similar to FIG. 2, but showing still another embodiment of the present invention.

DESCRIPTION OF THE PREFERRED EMBODIMENTS

Referring now specifically to the drawings wherein like reference numerals designate identical or corresponding parts throughout the several views, FIG. 1 shows a watering device 10 constructed in accordance with the present invention. In FIG. 1 a casing 11 is vertically disposed and extends upwardly from a concrete footing 12 used to install this animal watering device 10. A cap 13 is positioned on top of the casing 11 for the purpose of retaining heat within the casing 11 and also making the watering device substantially water tight and shielding it from the elements. A plurality of nipple valves 14 extend from the casing 11 for allowing animals such as hogs to drink therefrom as is well known in this art.

Referring now to FIG. 2 which shows the parts of this invention with more particularity, it can be seen that there is a water supply pipe 15 which is externally threaded at the bottom end 16 thereof for connection to a water supply line (not shown) which is normally below the freeze line for the particular geographic location where the device is to be installed. This water supply pipe 15 extends upwardly and has at least one water connection extending therefrom to which at least one nipple valve 14 is attached. Referring back to FIG. 1, it can be seen that there are three nipple valves 14 attached to the water supply pipe 15 but any number desired can be used.

The top of the water supply line 15 is also externally threaded and is attached to a coupling member 17 which, in turn, is connected to the nipple valve 14. These nipple valves 14 are normally threadedly attached to the member 17 or to a coupling element which is connected to the element 17, and it is to be understood that a plug can be inserted instead of a nipple valve 14 if it is desired to close off one of the openings and not use it. A plastic polyvinyl-chloride baffle member 18 is disposed within the pipe 15 is shown in FIGS. 2 and 3. This baffle member 18 is tapered on the longitudinal edges thereof and is slightly wider than the internal cross-sectional diameter of the pipe 15, so that when it is inserted into the pipe 15, it will remain in place despite external and internal forces such as water pressure. It is important to note the orientation of the baffle member 18 with respect to the heating element 19 and the power supply conduit opening 20 as will be explained below.

The heating element 19 is disposed within a heating conduit 21 which passes in very close proximity if not in contact with the water supply pipe 15 for the purpose of transmitting heat from the heating element 19 to the water supply pipe 15 and to the water therein. The outer casing 11 encompasses all of the elements aforementioned and also is filled with an insulating material such a high efficiency urethane foam to allow the device to retain the heat generated and not to lose this heat to the outside air. A power supply cord 23 extends up through the power supply conduit 20 for allowing the power supply cord 23 to come from under the ground and not have wires leading to the top of the watering device 10 which could possibly be interfered with by animals drinking from the watering device 10.

In operation of the preferred embodiment of FIGS. 1-3, it is noted that the source of heat 19 is on one side of the water supply pipe 15 and that the positioning of the supply conduit 20 causes there to be less insulation and therefore a colder place in the watering device on that side of the pipe 15. Consequently, the left side portion 24 of the water supply pipe 15 as seen in FIG. 2 has a greater concentration of heat, and the portion 25 on the right side of baffle member 18 as seen in FIGS. 2 and 3 is colder than the water on the other side thereof. Consequently, the water in the portion 24 is rising because it is heated and the water in the portion 25 is descending because it is cooler, thereby causing a circulation around the baffle member 18 as is clearly shown in FIG. 2. This, therefore, causes the heat from the heating element 19 to be evenly distributed in the inlet water pipe 15 rather than to be concentrated near the top end thereof. For example, in one application of this device it was determined that with the same heating element in use that the temperature at the top near nipple valve 14 was 170° F. when the baffle member 18 was not present, and all other conditions remaining the same the temperature at the top nipple valves 14 was 70° F. when the baffle member 18 was present. Accordingly, it can be seen that the addition of the baffle member 18 does indeed accomplish all of the objects set forth above.

Referring to the alternate embodiment shown in FIG. 4, it is noted that there is a water inlet 26 which would correspond to the lower portion of water supply pipe 15 in FIG. 2, and a water outlet 27 which corresponds to the upper portion of water supply pipe 15 in FIG. 2. A connection 17 is also provided for connection to the nipple valve 14. A heating element 19 is provided in the FIG. 4 embodiment and a heating element conduit is not shown, although it is preferably used. Furthermore, a power supply conduit would be used in the FIG. 4 embodiment in the same way and positioned at the same place as in the embodiment of FIGS. 1-3. The operation of the FIG. 4 embodiment is also substantially the same as in the embodiment discussed above wherein a first conduit 28 is adjacent to the heating source 19 and therefore the heated water automatically moves upwardly in the direction of the arrows 29; and, because the second conduit 30 is colder, the water in this pipe flows downwardly in the direction of the arrows 31. Consequently, it can be easily appreciated that this circulation distributes the heat from the heating element 19 throughout most of the length of the water supply inlet structure and prevents a buildup of heat close to the heating element 19.

Referring now to the FIG. 5 embodiment, it is noted that everthing is essentially the same as in the embodiment of FIGS. 1-3 except that instead of having a central flat baffle member 18, a baffle pipe structure 32 is utilized. This baffle pipe 32 is merely suspended in the inlet water supply pipe 15 by use of a pin member 33 which passes through the baffle pipe 32 and rests on a ledge 34 on top of the water supply pipe 15. This baffle pipe 32 is open at the top and the bottom ends thereof. Consequently, the heat from the heating element 19 tends to cause the water around the baffle pipe 32 to be heated and thereby causes it to rise as indicated by the arrows, and the cooler water within the baffle pipe tends to descend in the direction of the arrows within the baffle pipe 32. This circulation continues to thereby evenly distribute the heat within the animal watering device to accomplish the objects set forth above.

Obviously, many modifications and variations of the present invention are possible in light of the above teachings. It is therefore to be understood that, within the scope of the appended claims, the invention may be practiced otherwise than as specifically described.

I claim:

1. In an animal watering device of a type having an exterior housing; a water supply pipe disposed in said housing, a heating conduit disposed within said housing adjacent to one side of said water supply pipe; heating means disposed in said heating conduit for heating the water within said pipe; animal watering means connected to said housing and to said water supply pipe for allowing animals to obtain water therefrom, said supply pipe extending from a point below the frost level of the ground to a point adjacent said animal watering means; insulation means within said housing and surrounding said water supply pipe and said conduit; the improvement comprising:

means for causing circulation of water within said water supply pipe including a circuitous passageway disposed within said water supply pipe, circulation means including a baffle member disposed centrally of said supply pipe and extending from said first point below the frost line to said second point adjacent said animal watering means, said baffle member being vertically disposed and extending along the center line of said water supply pipe thereby dividing the supply pipe into two sections, one of said sections being adjacent to said heating conduit whereby water within said one section becomes heated more than in the other section, said baffle member being an elongated flat flexible plate having a width slightly wider than the internal diameter of the supply pipe whereby it can readily be inserted into said supply pipe and remain in place by friction against the interior walls of said supply pipe, said baffle member being thinner at the edges thereof than in the middle thereof to facilitate insertion into the water supply pipe.

2. The animal watering device of claim 1 wherein said baffle member is made of a material having low thermal conductivity properties whereby heat is not readily conducted from said first section to said second section through said baffle member.

3. The animal watering device of claim 1 wherein said baffle member is formed of polyvinyl-chloride plastic.

4. The animal watering device of claim 1 wherein said baffle member is the shape of a parallelogram in cross section whereby a plurality of baffle members can be constructed with a minimum of wasted material from a single sheet of material.

* * * * *